(12) United States Patent
Brown et al.

(10) Patent No.: US 11,853,892 B2
(45) Date of Patent: Dec. 26, 2023

(54) LEARNING TO SEGMENT VIA CUT-AND-PASTE

(71) Applicant: Google LLC, Mountain View, CA (US)

(72) Inventors: Matthew Alun Brown, Seattle, WA (US); Jonathan Chung-Kuan Huang, Seattle, WA (US); Tal Remez, Tel-Aviv (IL)

(73) Assignee: GOOGLE LLC, Mountain View, CA (US)

( * ) Notice: Subject to any disclaimer, the term of this patent is extended or adjusted under 35 U.S.C. 154(b) by 404 days.

(21) Appl. No.: 17/252,663

(22) PCT Filed: Jul. 10, 2019

(86) PCT No.: PCT/US2019/041103
§ 371 (c)(1),
(2) Date: Dec. 15, 2020

(87) PCT Pub. No.: WO2020/014294
PCT Pub. Date: Jan. 16, 2020

(65) Prior Publication Data
US 2021/0256707 A1 Aug. 19, 2021

Related U.S. Application Data

(60) Provisional application No. 62/696,447, filed on Jul. 11, 2018.

(51) Int. Cl.
| | |
|---|---|
| *G06T 7/194* | (2017.01) |
| *G06T 7/11* | (2017.01) |
| *G06T 11/20* | (2006.01) |
| *G06V 10/764* | (2022.01) |
| *G06V 10/82* | (2022.01) |

(Continued)

(52) U.S. Cl.
CPC ............. *G06N 3/084* (2013.01); *G06N 3/045* (2023.01); *G06T 7/11* (2017.01); *G06T 7/194* (2017.01);
(Continued)

(58) Field of Classification Search
CPC ........ G06N 3/084; G06N 3/045; G06N 3/044; G06N 3/048; G06N 3/047; G06N 3/082;
(Continued)

(56) References Cited

U.S. PATENT DOCUMENTS 10,540,757 B1 * 1/2020 Bouhnik .................... G06T 7/37
11,527,078 B2 * 12/2022 Littman ................. G06V 10/82
(Continued)

OTHER PUBLICATIONS

Chen, M. "Unsupervised Object Segementation by Redrawing" 33rd Conf. on Neural Information Processing Systems (NeurIPS 2019), pp. 1-18.*
(Continued)

*Primary Examiner* — Mia M Thomas
(74) *Attorney, Agent, or Firm* — Dority & Manning, P.A.

(57) ABSTRACT

Example aspects of the present disclosure are directed to systems and methods that enable weakly-supervised learning of instance segmentation by applying a cut-and-paste technique to training of a generator model included in a generative adversarial network. In particular, the present disclosure provides a weakly-supervised approach to object instance segmentation. In some implementations, starting with known or predicted object bounding boxes, a generator model can learn to generate object masks by playing a game of cut-and-paste in an adversarial learning setup.

20 Claims, 16 Drawing Sheets

(51) Int. Cl.
*G06N 3/084* (2023.01)
*G06N 3/045* (2023.01)

(52) U.S. Cl.
CPC ............ *G06T 11/20* (2013.01); *G06V 10/764* (2022.01); *G06V 10/82* (2022.01); *G06T 2207/20081* (2013.01); *G06T 2207/20084* (2013.01); *G06T 2210/12* (2013.01)

(58) Field of Classification Search
CPC . G06T 7/11; G06T 7/194; G06T 11/20; G06T 2207/20081; G06T 2207/20084; G06T 2210/12; G06V 10/764; G06V 10/82
See application file for complete search history.

(56) References Cited

U.S. PATENT DOCUMENTS

| | | | | |
|---|---|---|---|---|
| 11,587,271 | B2* | 2/2023 | Neuberger | ............... G06T 5/50 |
| 11,669,566 | B2* | 6/2023 | Motiian | ............... G06V 10/56 |
| | | | | 707/728 |
| 2019/0286942 | A1* | 9/2019 | Abhiram | ............. G06F 18/2148 |
| 2019/0286950 | A1* | 9/2019 | Kiapour | ................ G06F 16/532 |
| 2019/0318474 | A1* | 10/2019 | Han | ........................ A61N 5/103 |
| 2019/0392254 | A1* | 12/2019 | Oh | ........................ B25J 11/0085 |
| 2020/0320351 | A1* | 10/2020 | Nikolenko | ............. G06F 18/217 |
| 2021/0073270 | A1* | 3/2021 | Motiian | ................ G06V 10/763 |
| 2022/0019861 | A1* | 1/2022 | Durr | ..................... G06N 3/045 |
| 2022/0121705 | A1* | 4/2022 | Motiian | ................ G06F 16/532 |
| 2022/0130078 | A1* | 4/2022 | Maheshwari | ........... G06V 10/82 |
| 2022/0301295 | A1* | 9/2022 | Livet | ...................... G06N 3/044 |
| 2022/0335672 | A1* | 10/2022 | Lee | ......................... G06T 11/60 |

OTHER PUBLICATIONS

International Search Report for PCT/US2019/041103, dated Sep. 3, 2019, 1 page.
Remez et al, "Learning to Segment via Cut-and-Paste", arXiv:1803v1, Mar. 16, 2018, 17 pages.

* cited by examiner

LEARNING TO SEGMENT VIA CUT-AND-PASTE

PRIORITY CLAIM

The present application is a national stage filing under 35 U.S.C. § 371 of Patent Cooperation Treaty Application Serial No. PCT/US2019/041103, filed on Jul. 10, 2019, which claims the benefit of U.S. Provisional Application 62/696,447 having a filing date of Jul. 11, 2018. Applicant claims priority to and the benefit of each of such applications and incorporate all such applications herein by reference in their entirety.

FIELD

The present disclosure relates generally to machine learning. More particularly, the present disclosure relates to weakly-supervised learning of instance segmentation by applying a cut-and-paste technique to, for example, a generative adversarial network.

BACKGROUND

Instance segmentation has seen much progress in recent years, with certain methods now able to generate realistic masks by building on the success of convolutional object detectors. However, success has come at the cost of a significant labelling effort. For example, the COCO segmentation dataset required around 40 person-years of labelling time for its 80 object categories. This significant effort to generate ground truth segmentation masks represents a large expenditure of time and effort and, therefore, alternative approaches are desirable. Thus, techniques for learning to perform object segmentation that do not rely on pixel-level labelling are desired.

SUMMARY

Aspects and advantages of embodiments of the present disclosure will be set forth in part in the following description, or can be learned from the description, or can be learned through practice of the embodiments.

One example aspect of the present disclosure is directed to a computing system that includes one or more processors and one or more non-transitory computer-readable media. The one or more non-transitory computer-readable media collectively store a generative adversarial network that includes a generator model and a discriminator model. The one or more non-transitory computer-readable media collectively store instructions that, when executed by the one or more processors, cause the computing system to perform operations to train the generative adversarial network for object segmentation. The operations include obtaining a first image that depicts an object, the first image including a plurality of pixels. The operations include predicting, by the generator model, a segmentation mask for the object, where the segmentation mask identifies a subset of the plurality of pixels that correspond to the object. The operations include extracting a first portion of the first image based at least in part on the segmentation mask, where the first portion includes the subset of the plurality of pixels. The operations include generating a second image by pasting the first portion of the first image onto a background image portion. The operations include providing, by the discriminator model, a discrimination output that indicates a judgment by the discriminator model that the second image is authentic or inauthentic. The operations include modifying one or more parameters of the generator model based at least in part on the discrimination output provided by the discriminator model.

Another example aspect of the present disclosure is directed to a computer-implemented method. The method includes obtaining, by one or more computing devices, a first image that depicts an object and data that describes an approximate location of the object within the first image. The method includes predicting, by a generator model implemented by the one or more computing devices, a segmentation mask for the object based at least in part on the approximate location. The method includes extracting, by the one or more computing devices, a first portion of the first image by application of the segmentation mask to the first image. The method includes extracting, by the one or more computing devices, a second portion of the first image from a location other than the approximate location of the object. The method includes compositing, by the one or more computing devices, the first portion of the first image with the second portion of the first image to obtain a second image. The method includes predicting, by a discriminator model implemented by the one or more computing devices, whether the second image is authentic or inauthentic.

Another example aspect of the present disclosure is directed to one or more non-transitory computer-readable media that collectively store a machine-learned generator model configured to obtain imagery that depicts objects and to generate segmentation masks that segment the objects from backgrounds, the machine-learned generator model having been trained by a process that includes: obtaining a first image that depicts an object, the first image comprising a plurality of pixels; predicting, by the machine-learned generator model, a segmentation mask for the object, wherein the segmentation mask identifies a subset of the plurality of pixels that correspond to the object; extracting a first portion of the first image based at least in part on the segmentation mask, wherein the first portion comprises the subset of the plurality of pixels; generating a second image by pasting the first portion of the first image onto a background image portion; providing, by the discriminator model, a discrimination output that indicates a judgment by the discriminator model that the second image is authentic or inauthentic; and modifying one or more parameters of the machine-learned generator model based at least in part on the discrimination output provided by the discriminator model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
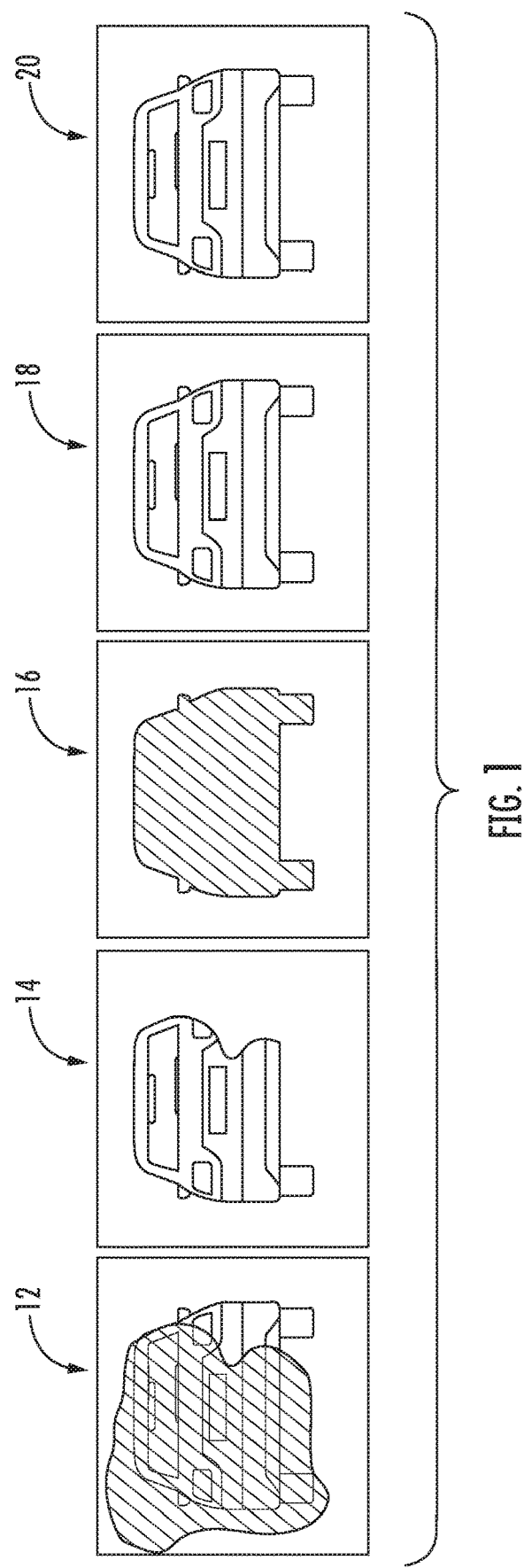
FIG. 1 depicts example images and masks according to example aspects of the present disclosure.

Reference numerals that are repeated across plural figures are intended to identify the same features in various implementations.

DETAILED DESCRIPTION

1. Overview

Example aspects of the present disclosure are directed to systems and methods that enable weakly-supervised learning of instance segmentation by applying a cut-and-paste technique to training of a generator model included in a generative adversarial network. In particular, the present disclosure provides a weakly-supervised approach to object instance segmentation. In some implementations, starting with known or predicted object bounding boxes, a generator model can learn to generate object masks by playing a game of cut-and-paste in an adversarial learning setup. In particular, a mask generator can take, for example, a detection box and image features (e.g., Faster R-CNN features) from an image that depicts an object and can construct a segmentation mask. A training system can use the segmentation mask to cut-and-paste the object into a new image location. A discriminator can attempt to distinguish between real objects and those cut and pasted via the generator, giving a learning signal that leads to improved object masks. The proposed framework has been verified experimentally using Cityscapes, COCO, and aerial image datasets. In particular, it has been shown that the generator model can learn to segment objects without ever having seen a mask in training. Example implementations of the proposed systems and methods exceed the performance of existing weakly supervised methods, without requiring hand-tuned segment proposals, and reach 90% of supervised performance.

More particularly, as described in the background section, recent progress in instance segmentation has been largely attributable to supervised techniques which rely upon a momentous labelling effort, in which segmentation masks are manually generated on a pixel-by-pixel basis. In contrast to these approaches, the present disclosure enables weakly-supervised learning of instance segmentation that does not require ground-truth segmentation masks for training.

In particular, aspects of the present disclosure rely only on weakly supervised signals such as, for example, data descriptive of an approximate location of the object within the first image. As one example, the data descriptive of the approximate location of the object within the image can be a bounding box that bounds the object within the image. As another example, the data descriptive of the approximate location of the object within the image can simply include a single point that indicates a generalized location of the object (e.g., roughly the centroid of the object). For example, the bounding box and/or the single point can be provided manually using input tools such as a mouse or touch-screen.

Certain modern object detection datasets have bounding boxes for up to 30k categories. While still a considerable labelling effort, these bounding boxes can be generated roughly 10 times faster than the per-pixel segmentation masks required for fully supervised instance segmentation training. Moreover, labelling boxes has fixed complexity, whereas pixel-level labelling takes longer for objects with complex boundaries. In the COCO dataset, for example, some complex object classes, such as 'bicycle', are at best approximately labelled.

In view of the ability to generate ground-truth bounding boxes (or other approximations of object location) with scales of magnitude less time and effort than per-pixel segmentation masks, the present disclosure provides techniques that enable learning instance segmentation directly from bounding box data, and without ground truth masks. In particular, aspects of the present disclosure are directed to a technique which can be referred to as "cut-and-paste prior", to solve this problem.

Figure 2:
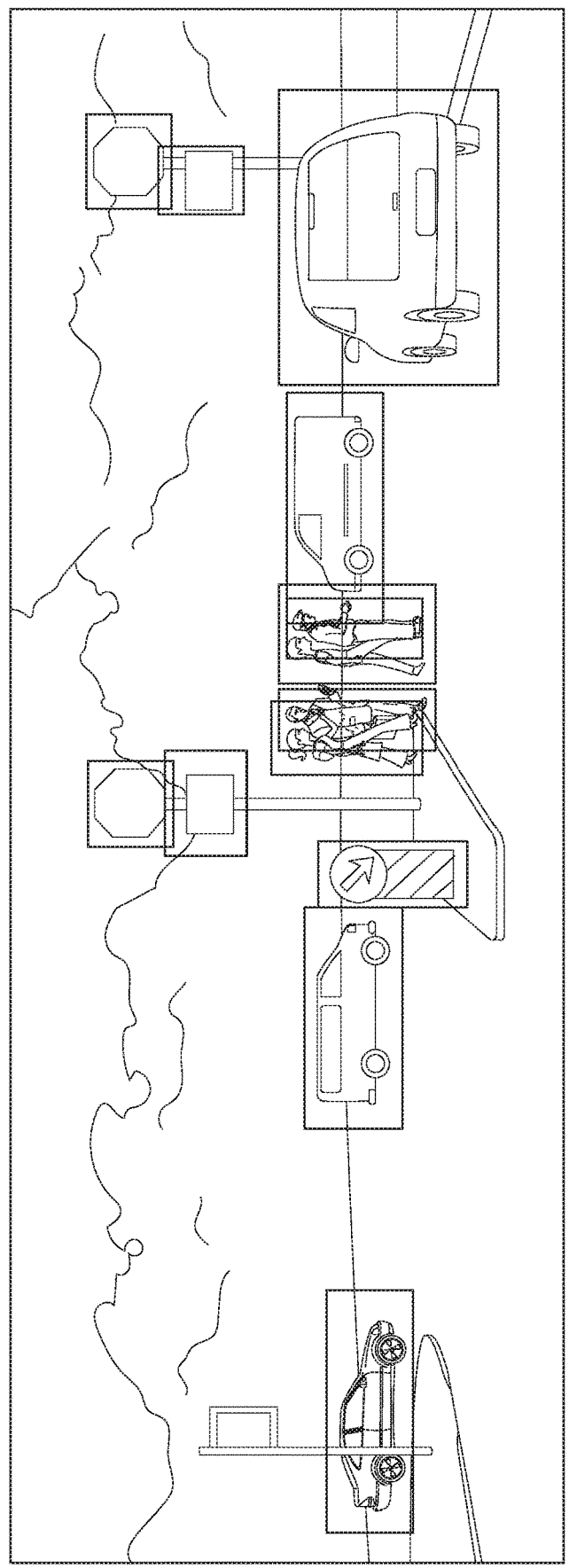
FIG. 2 depicts an example image with example bounding boxes and segmentation masks according to example aspects of the present disclosure.

As an example, FIG. 1 illustrates example images and masks generated in an example implementation of the cut and paste approach which iterates to lean accurate segmentation masks by trying to generate realistic images. A poor mask estimate 12 generates an unconvincing paste 14, while a good mask 16 results in a convincing paste 18. Training a discriminator network to distinguish pasted from real images 20 creates a learning signal that encourages the generator to create better segmentations. In such fashion, the generator can learn to segment objects without ever seeing ground truth masks and uses only weak input such as bounding boxes. As an example, FIG. 2 illustrates an image that includes objects that have been marked with bounding boxes. The corresponding masks generated for such objects are overlaid upon the image.

The approach described herein is qualitatively different from all prior approaches. In particular, the systems and methods of the present disclosure do not require segment proposals, pre-trained boundary detectors, or other hand-tuned initialization/constraints. Neither does the present disclosure require iteration towards prediction and label consistency. Instead, the priors used are encapsulated in the structure of a generative adversarial network that includes generator and discriminator models, and also in the "cut-and-paste" prior for object segmentation.

The cut-and-paste prior encapsulates the basic idea that objects can move independently of their background. More precisely, according to an aspect of the present disclosure, objects can be cut out from one portion of an image, and pasted into another, and still appear realistic (see, e.g., FIG. 1). With the help of a discriminator model to judge realism, this process can be used to provide a training signal for an instance segmentation network.

Generative Adversarial Networks (GANs) have been shown to be effective in modelling realistic images (e.g., hallucinating faces, translating between image modalities, and the like). However, rather than trying to generate images, the present disclosure uses a GAN to directly generate segmentation masks. This allows the use of objective measures of performance (e.g., IoU against ground truth) for evaluation. Note, however, that the approach of using cut-and-paste to form a loss function is not the same as training data augmentation via cut-and-paste, which takes existing masks and creates more training data out of it.

Thus, the present disclosure proposes and formalizes a new cut-and-paste adversarial training scheme for weakly supervised (e.g., box-supervised) instance segmentation, which captures an intuitive prior, that objects can move independently of their background. That is, objects are "cut-and-pastable". The concept is coupled with a generative adversarial network to learn object masks.

The present disclosure also discusses the problem of identifying where to paste new objects in an image. Even though objects are rarely truly independent of their background (e.g., cars do not typically appear in the middle of blue skies or on top of trees), the present disclosure shows that simple randomized heuristics for selecting pasting locations are surprisingly effective on real data. For example, intelligent object placement in the paste step can significantly improve mask estimation. As examples, object placement, color, and/or illumination can depend on the destination image.

Finally, the present disclosure showcases the success and generality of the cut-and-paste approach by demonstrating that the method effectively learns to segment objects on a variety of datasets (street scenes, everyday objects, aerial imagery), without ever having access to ground truth masks as supervision and without the need for pre-trained segment or boundary detectors. The training method is demonstrated to be stable and to yield models that outperform existing weakly supervised methods, reaching 90% of supervised model performance.

The present disclosure provides a number of technical effects and benefits. As one example technical effect and benefit, the systems and methods of the present disclosure enable weakly supervised learning and eliminate the need for full ground truth segmentation masks. As described, the generation of ground truth segmentation masks is tedious and represents a large expenditure of time and effort. Thus, by enabling weakly supervised learning, this large expenditure of time and effort can be avoided.

The weakly supervised learning approach can also enable much quicker training of models to generate segmentation masks for different, random objects. As one example, to train a model using fully supervised techniques to generate segmentation masks for oddly shaped or challenging objects such as a coral, a whole new set of ground truth segmentation masks would need to be manually generated. However, using the weakly supervised approach described herein, a model can be trained relatively quickly using only imagery of the oddly shaped object and, in some implementations, a weak supervision signal that describes the approximate location of the object within each image. Thus, new segmentation models can quickly be generated for any number of different objects.

As another example technical effect and benefit, as demonstrated by the experimental results provided herein, example implementations of the present disclosure exceed the performance of certain existing weakly supervised methods, without requiring hand-tuned segment proposals, and further reach 90% of supervised performance. These experimental results are discussed in further detail below.

2. An Example Adversarial Formulation of the Cut and Paste Loss

Figure 3:
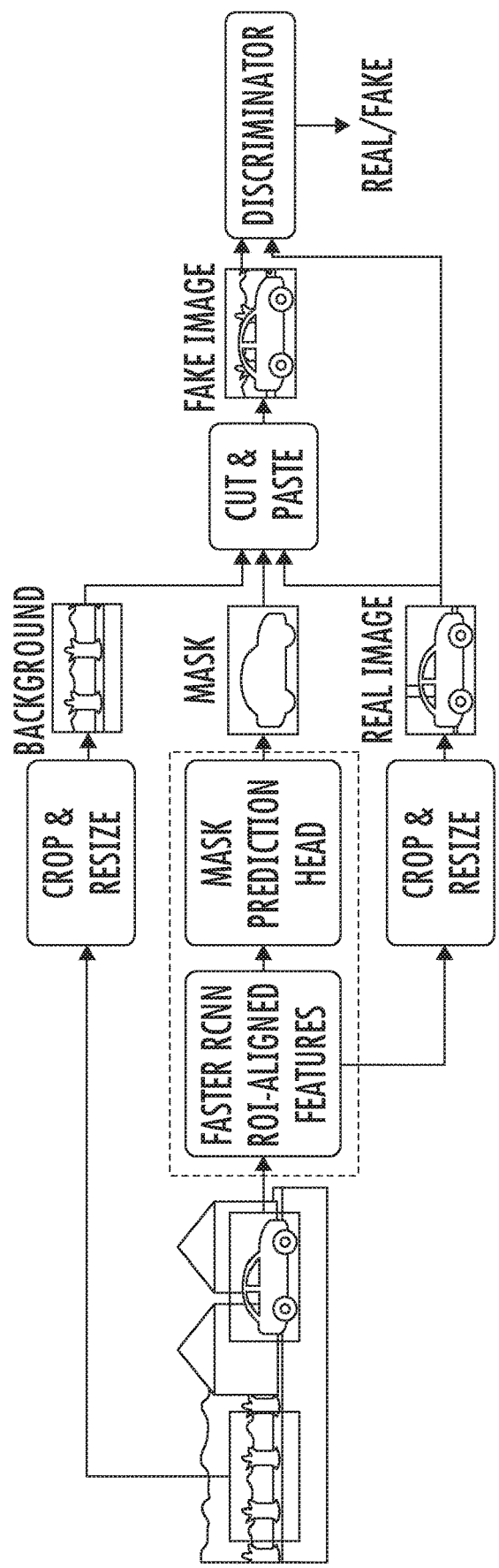
FIG. 3 depicts a workflow diagram of an example generative adversarial network training framework according to example embodiments of the present disclosure.

An overview of one example implementation of the cut and paste learning approach is shown in FIG. 3. In particular, as illustrated in FIG. 3, a generator model receives a bounding box containing a car and predicts its mask. The discriminator alternately sees a cut and pasted car with a new background, or a real car image. Simultaneous training of generator and discriminator leads to improved object masks. Trainable blocks include the mask prediction head of the generator model and discriminator model. The generator and/or discriminator can be any type of machine-learned model including, as example, artificial neural networks such as, for example, convolutional neural networks. However, the generator and/or discriminator can be other forms of machine-learned models other than neural networks. FIG. 3 shows one example of the cut and paste approach. Other, different configurations may be used to implement the cut and paste approach. For example, more or fewer components of the framework can be trainable.

More particularly, a model taking the form: $\mathcal{M} = G(X, \mathcal{B})$ can be trained to predict an instance mask $\mathcal{M}$ given an image X and a bounding box $\mathcal{B}$ surrounding the instance of interest. The bounding box is an example. Other approximations of object location can be used as well.

For simplicity of discussion, classes will be ignored and it can be assumed that instances are of the same class (e.g., 'person' or 'car'). An independent model can be trained per class. As recognized by the present disclosure, it is desirable to assign a low loss to a predicted mask if copying the pixels from the mask $\mathcal{M}$ and pasting into a new part of the image X (or some other background image portion) yields a plausible image patch and high loss otherwise (see, e.g., FIG. 1).

In order to measure the notion of "plausibility", a GAN can be used, viewing the function G as a generator. Given a generated mask $\mathcal{M}$, a new image patch F can be synthesized by compositing image $X\mathcal{B}$ from bounding box $\mathcal{B}$ with a new background image $X\mathcal{B}'$, from location $\mathcal{B}'$ (typically in the same image):

$$F = \mathcal{M}X_\beta + (1 - \mathcal{M})X_{\beta'}. \quad (1)$$

The fake image F can be fed to a second model, the discriminator, whose job is to distinguish whether F is real or synthesized. Next, simultaneously train the discriminator to distinguish reals from fakes and the generator to make the discriminator's error rate as high as possible. As one example, maximize with respect to parameters of the discriminator D and minimize with respect to parameters of the generator G in the following example loss function:

$$\mathcal{L}_{CPGAN} = \mathbb{E}\log D(X_{\mathcal{B}}) + \log(1 - D(F)). \tag{2}$$

The example loss function (2) is one example function that can be used. Other loss functions can be used as well.

This loss can be referred to as the cut-and-paste loss, since it aims to align real images and their cut-and-pasted counterparts. Note that the fake image F is a function of the generator G via the mask $\mathcal{M} = G(X,\mathcal{B})$, as specified in Equation (1). The expectations are over $(X,\mathcal{B}) \sim p_{data}$ being the input set of images and bounding boxes, with, for example, $\mathcal{B}'$ drawn randomly as described in the Section 2.1 below. Over training iterations, the only way that the generator can successfully "fool" the discriminator is by generating correct masks.

2.1 Where to Paste

The choice of where to paste an object to generate a realistic looking result is clearly important for human observers (e.g., see FIG. 4). It is also data dependent. For example, buildings may appear at any (x, y) location in aerial imagery with equal probability (see, e.g., FIG. 12), but realistic pedestrian placement and scale is highly constrained in street scenes. Whilst sophisticated pasting strategies might be devised, good results can also be obtained using simple ones. For example, two example pasting strategies include: 1) Uniform pasting: paste anywhere into the same image, for example, taking care not to overlap the same object class, 2) Depth sensitive pasting: take care to preserve the correct scale when pasting using knowledge of the scene geometry. This is discussed further in the experiments reported in Section 4.3 on the Cityscapes, COCO, and aerial imagery datasets.

Figure 4A:
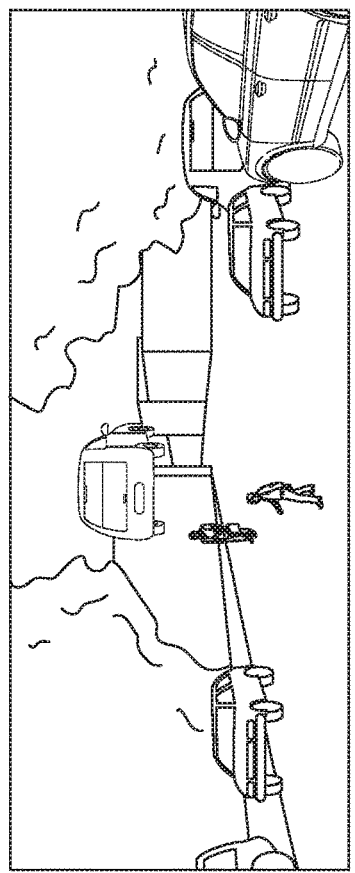
FIG. 4 depicts example images in which an image portion has been pasted according to different rules according to example embodiments of the present disclosure.
Figure 4B:
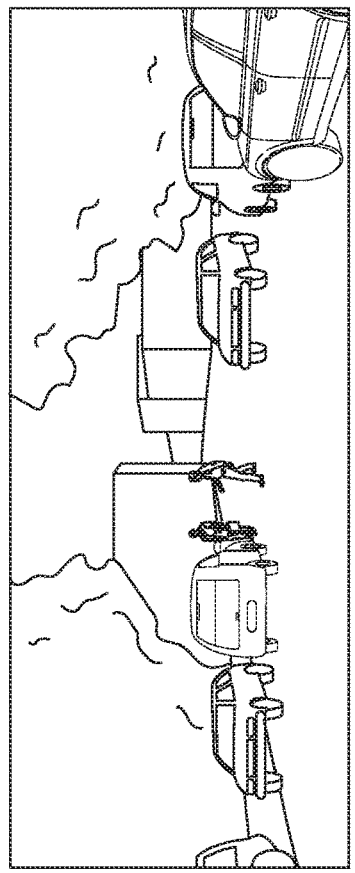

FIGS. 4A and 4B provides examples of cut-and-paste locations in which a few objects have been cut-and-pasted to new locations in the original image. In FIG. 4A they were pasted along the same scanline as their original position, making it harder to tell them apart; In FIG. 4B they were pasted at random positions making it much easier to identify.

2.2 Avoiding Degenerate Solutions

The learning objectives described herein are based on realism in the pasted result; this strategy usually leads to good solutions, but there are a few degenerate cases. For example, realistic images can be generated by choosing all of the pixels or none of the pixels in the bounding box (though in the latter case this doesn't contain the object). Also, some objects are modular and part of the object can be pasted and still give a realistic image. Each of these cases is examined in turn.

The first case (generator marks all pixels as foreground) can be mitigated by giving the discriminator a larger viewport than the region into which the generator pastes. Giving the discriminator a small band of context around the pasted object (e.g., 10% of box width) allows for easy identification of this failure mode, as the background will change abruptly at the bounding box borders. Note that this strategy will fail in cases where source and destination backgrounds are identical, (e.g., pasting an airplane from one blue sky to another identical sky, but these cases are rare for most classes).

If the generator decides to label none of the pixels as belonging to the object, the resulting fake image will look realistic, but will not contain the object of interest. This case should be automatically solved in the framework, since the discriminator will expect to see the object present. However, adding an explicit classification loss significantly aids stability and improves performance in some cases. To this end, in some implementations, the frame work can additionally include an additional classifier $D_{CLS}$ which explicitly encourages the model to ensure that the object of interest is really present (see, e.g., FIG. 11B). One way to think about this new loss is that the generator is now trying to fool two discriminators: one that had been trained on a previous classification task (and is, in some implementations, frozen), and another that is training and evolving with the generator. This gives an additional classification loss term for the generator:

$$\mathcal{L}_{CLS} = \mathbb{E}\log(1 - D_{CLS}(F)). \tag{3}$$

The classifier can be any type of classifier including machine-learned classifiers. As one example, the classifier can be or include a machine-learned artificial neural network.

A final failure mode can occur if the generator chooses to paste some sub-part of an object that may still be realistic in isolation (e.g., part of a building or other modular structure). This is to some extent addressed by the classification loss $\mathcal{L}_{CLS}$, which favors complete objects being pasted. However, a complementary cut loss can also be used to address this, as described below.

2.3 Adversarial Cut Loss

In some implementations of the framework, a generator learns to identify the correct subset of image pixels such that pasting those pixels into a new image results in a believable result. However, for certain objects, such as modular or repeated structures, it is possible that copying a sub-part of the object results in a plausible image. One example is buildings, where sub-parts often resemble realistic buildings (see e.g., FIG. 12). In these cases, the part of the scene left behind after the cut operation will often contain parts of the object.

To mitigate this effect, set up a secondary adversarial game can be established that takes as input the background that remains after cutting out the object $\tilde{X}_{\mathcal{B}}$, and compares this to the same cut applied elsewhere in the scene, $\tilde{F}$. Specifically, these remaining portions can be expressed as $\tilde{X}_{\mathcal{B}} = (1-\mathcal{M})X_{\mathcal{B}}$ and $\tilde{F} = (1-\mathcal{M})X_{\mathcal{B}'}$. In this new adversarial game, the mask generator must now also fool a new discriminator, $D_{CUT}$, leading to an additional loss term:

$$\mathcal{L}_{CGAN} = \mathbb{E}\log D_{CUT}((1-\mathcal{M})X_{\mathcal{B}}) + \log(1 - D_{CUT}((1-\mathcal{M})X_{\mathcal{B}'})), \tag{4}$$

which can be referred to as "cut" loss, as it penalizes differences between the cut operation on real and background imagery.

Figure 5:
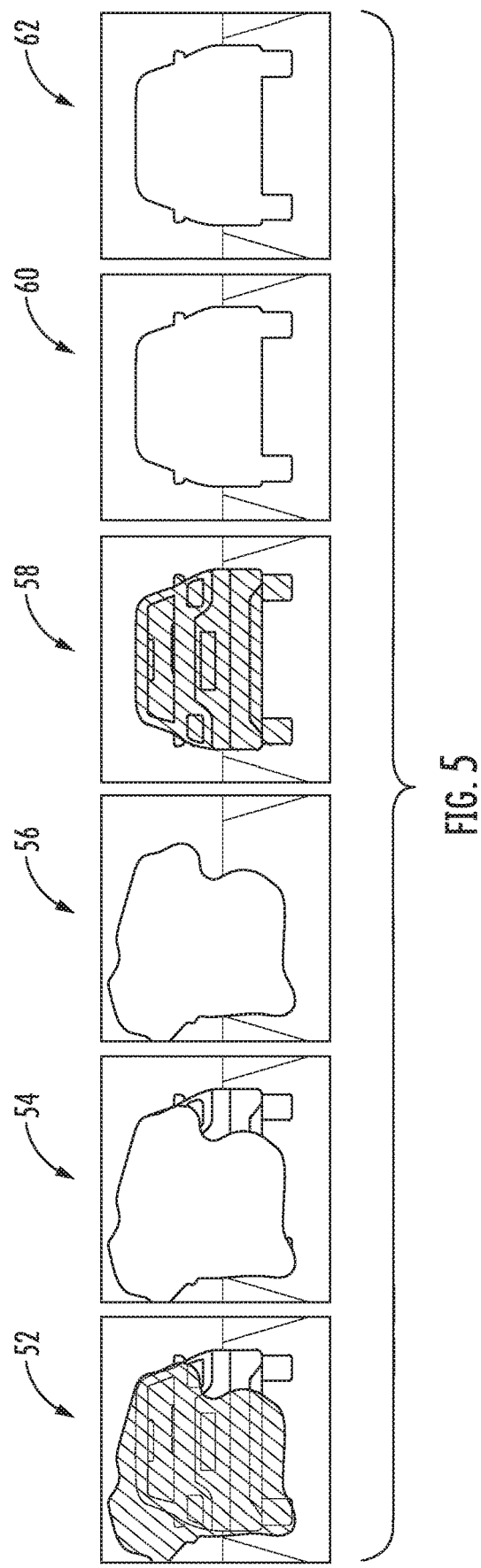
FIG. 5 depicts example images of cut loss according to example embodiments of the present disclosure.

As examples, FIG. 5 shows example cut loss illustrations. A poor mask 52 leaves object parts behind, hence there is a difference when applied to the input 54 or random image 56. A good mask 58 gives indistinguishable results when applied to the input 60 or random image 62.

2.4 Overall Loss Function

One example overall loss function that can be used is the sum of cut and paste, classification, and cut losses:

$$\mathcal{L} = \mathcal{L}_{CPGAN} + w_{cls}\mathcal{L}_{CLS} + w_{cut}\mathcal{L}_{CGAN}. \tag{5}$$

The above is an example. In other implementations, any of the three loss terms can be used alone or in various combinations with any of the other loss terms.

In some implementations, a LSGAN formulation can be used (see, Mao et al.: Least squares generative adversarial networks. In: 2017 IEEE International Conference on Computer Vision (ICCV), IEEE (2017) 2813-2821), which converts min/max optimization of GAN loss terms of the form $\mathcal{L} = \mathbb{E} \log(1-D(X))+\log(1-D(G(X)))$ into separate optimizations for the discriminator and generator:

$$\min_D \mathbb{E}\left(D(G(X))^2 + (D(X)-1)^2\right), \min_G \mathbb{E}(D(G(X))-1)^2. \quad (6)$$

3. Example Architectures

In some implementations, there are three modules in the framework: (1) the generator, which predicts a mask, (2) the cut-and-paste module, which produces a "fake patch" given the predicted mask, and (3), the discriminator, which distinguishes between real and fake patches (see e.g., FIG. 3). In the following, an example architecture is described for each of these modules that was used in the experiments described herein.

Example generator architecture: One example generator is similar to that of Mask R-CNN. A ResNet-50 backbone can be used to extract ROI-aligned features and a mask prediction head can be applied to these features. One example mask prediction head is described in Table 1, and is comprised of a series of convolutions, bilinear upsampling operations, and a Sigmoid nonlinearity resulting in a 28×28 mask output. Using corner-aligned bilinear upsampling generally provides better results than transposed convolutions and nearest neighbor upsampling layers.

Cut-and-Paste Module: One example implementation of the cut-and-paste operation can be implemented using standard alpha compositing (Equation (1)). The inferred mask is typically at a lower resolution than the foreground and background images, so downsampling to the mask resolution can be performed before compositing. The image as a whole can be downsampled prior to portion extraction or the extracted portions can be downsampled after extraction. Note that careful sampling in this step is important, as convolutional networks can easily detect any aliasing or blurring artifacts, which are easy indicators that an image is fake. As explained in Section 2.2, the discriminator can be given a larger viewport than the original mask size. Therefore, in some implementations, the 28×28 masks can be padded with 3 pixels of zeros on each side.

Discriminator: One example discriminator receives an N×N image patch as input, and predicts whether the given patch is real/authentic or fake/inauthentic. One example discriminator architecture is presented in Table 1 below, and is comprised of a series of valid convolutions (convolutions without padding) followed by a fully connected layer and a Softmax.

Example Training Procedure: Example models were implemented in TensorFlow and were trained using a batch size of 4 instances for the generator and 8 instances for the discriminator (4 real and 4 fake). The Adam optimizer was used with learning rate of $5 \cdot 10^{-5}$, $\beta_1 = 0.9$, $\beta_2 = 0.999$, and $\varepsilon = 10^{-8}$. One million training iterations were performed, alternating optimization equally between generator and discriminator. The supervised model was trained similarly but with a cross-entropy loss on the ground truth masks. The backbone generating the features for the generator was pretrained on the COCO detection challenge data and was held frozen through training. The rest of the generator and discriminator layers were initialized using random Xavier initialization (Glorot and Bengio: Understanding the difficulty of training deep feedforward neural networks. In: Proceedings of the Thirteenth International Conference on Artificial Intelligence and Statistics. (2010) 249-256). CityScapes and COCO training data were augmented by adding random horizontal flips.

| Generator | |
|---|---|
| Output size | Layer |
| 7 ×7 × 2048 | Input, ROI-aligned features |
| 7 × 7 × 256 | Conv, 1 × 1 × 256, stride 1 |
| 7× 7 × 256 | Conv, 3 × 3 × 256, stride 1 |
| 14 × 14 × 256 | Bilinear upsampling |
| 14 × 14 × 256 | Conv, 3 × 3 × 256, stride 1 |
| 28 × 28 × 256 | Bilinear upsampling |
| 28 × 28 × 256 | Conv, 3 × 3 × 256, stride 1 |
| 28 × 28 × 1 | Conv, 3 × 3 × 1, stride 1 |
| 28 × 28 × 1 | Sigmoid |

| Discriminator | |
|---|---|
| Output size | Layer |
| 34 × 34 × 3 | Input image patch |
| 32 × 32 × 64 | Conv, 3 × 3 × 64, stride 1, valid |
| 15 × 15 × 128 | Conv, 3 × 3 × 128, stride 2, valid |
| 7 × 7 × 256 | Conv, 3 × 3 × 256, stride 2, valid |
| 3 × 3 × 512 | Conv, 3 × 3 × 512, stride 2, valid |
| 4608 | Flatten |
| 2 | Fully connected |
| 2 | Softmax |

Table 1: Example generator and discriminator architectures. One example generator takes ROI-aligned features from a Faster R-CNN detector (see Ren et al.: Faster R-CNN: Towards real-time object detection with region proposal networks. In: Advances in Neural Information Processing Systems. (2015) 91-99) and applies a mask prediction head similar to that used in Mask R-CNN (see He at al.: Mask R-CNN. In: IEEE International Conference on Computer Vision (ICCV). (2017) 2980-2988). One example discriminator can be applied directly on 34×34 image patches. After each convolution ReLU nonlinearities can be used for the generator and Leaky ReLUs (e.g., with $\alpha = 0.2$) can be used for the discriminator.

4. Example Experiments

This section presents the results of example experiments using street scenes (Cityscapes), common objects (COCO) and aerial image datasets. Overall results (Tables 2 and 3) indicate that example implementations of the framework described herein are competitive or better than other weakly supervised baselines. Some of the strengths and failure modes of the approach were also explored, including analysing dataset specific performance, effect of pasting strategies, settings for loss hyperparameters, and the effect of data scaling.

4.1 Evaluation Methodology and Baselines.

The proposed approach (which will be referred to in below tables as Cut&Paste) was compared to a few baseline methods, all of which take as input (1) an image and (2) a bounding box surrounding the instance to be segmented, and output a segmentation mask. The simplest baseline strategy (which is called Box) is to simply declare all pixels within the given ground truth bounding box to be the foreground/object. Since bounding boxes are tight around the objects in the datasets that was used, this is often a reasonable guess, assuming that no additional information is available. Another classic baseline is the GrabCut algorithm (rother et al.: Grabcut: Interactive foreground extraction using iterated graph cuts. In: ACM Transactions on graphics (TOG). Volume 23, ACM (2004) 309-314). Five iterations of the OpenCV implementation were used, guiding with a central foreground rectangle 40% of the box size if the initial iterations return a zero-mask.

The performance of the recent Simple Does It approach by Khoreva et al., (Simple does it: Weakly supervised instance and semantic segmentation. In: IEEE International Conference on Computer Vision and Pattern Recognition. (2017) 876-885) was also evaluated by running their publicly available pretrained instance segmentation model DeepLab$_{BOX}$, which was trained on PASCAL VOC and COCO.

In addition to these baselines, we also train a fully supervised version of the framework described herein (referred to as FullySupervised), which uses the example architecture for the generator described in Section 3, but is trained using cross entropy loss against ground truth masks. This provides an idea of the best performance we should expect from weakly supervised methods.

For methods outputting low-resolution masks (this includes Cut&Paste, FullySupervised, and Simple Does It), their masks were resized using bicubic interpolation back to the original image resolution prior to evaluation.

In contrast to typical generative models of images based on GANs, evaluations can be conducted based on objective measures. In this section the results are presented in terms of the mean intersection-over-union (mIoU) measure, a commonly used metric for segmentation. Since the bounding boxes are assumed to be given, average precision/recall based measures such as those used by the COCO dataset are omitted since they depend on the detected boxes.

4.2 CityScapes

The CityScapes dataset (Cordts et al.: The Cityscapes dataset for semantic urban scene understanding. In: Proc. Of the IEEE Conference on Computer Vision and Pattern Recogntion (CVPR) (2016)) consists of densely annotated imagery of street scenes from cameras mounted on a car. Images are usually wide enough that it is easy to find plausible pasting positions for fake objects, so one would expect our method to perform well on this kind of data.

To prepare the CityScapes data for training the models, the official training set was separated into a training set and a development set (the latter containing the sequences of Aachen, Bremen and Bochum), using the official validation set as a test set for all methods. Instance segmentation masks were extracted from the fine-grained annotated "left-camera" images for four classes: "car", "person", "traffic-light" and "traffic-sign", removing any cars or people smaller than 100 pixels along either axis, and any traffic lights or signs smaller than 25 pixels. "Traffic-light" and "Traffic-sign" instance segmentation masks are not provided with the dataset, but semantic segmentation masks are provided; thus to extract masks, consider each connected component of these classes as a separate instance.

Ground truth instance segmentations are used for evaluation, and for training the supervised version of FullySupervised. For the box-supervised versions, a combination of ground truth bounding boxes from the 2,975 annotated images, and additional bounding boxes generated by running a Faster R-CNN object detector on the 89,240 unannotated images in the leftImg8 bit sequence set were used.

The results, shown in Table 2, demonstrate that across all four classes, Cut&Paste consistently performs better than the Box and GrabCut baselines. Note that Box performs surprisingly well on some of these classes, notably signs and traffic lights, for which the ground truth bounding box is typically already a good fit. Cut&Paste also outperforms the Simple Does It approach and is within 90% of the fully supervised baseline on all but the "Car" class.

TABLE 2 mIOU performance on Cityscapes

| Method | Car | Person | Traffic-light | Traffic-sign |
|---|---|---|---|---|
| Box | 0.62 | 0.49 | 0.76 | 0.79 |
| GrabCut | 0.62 | 0.50 | 0.64 | 0.65 |
| Simple Does It | 0.68 | 0.53 | 0.60 | 0.51 |
| Cut&Paste | 0.67 | 0.54 | 0.77 | 0.79 |
| Fully Supervised | 0.80 | 0.61 | 0.79 | 0.81 |

Figure 6:
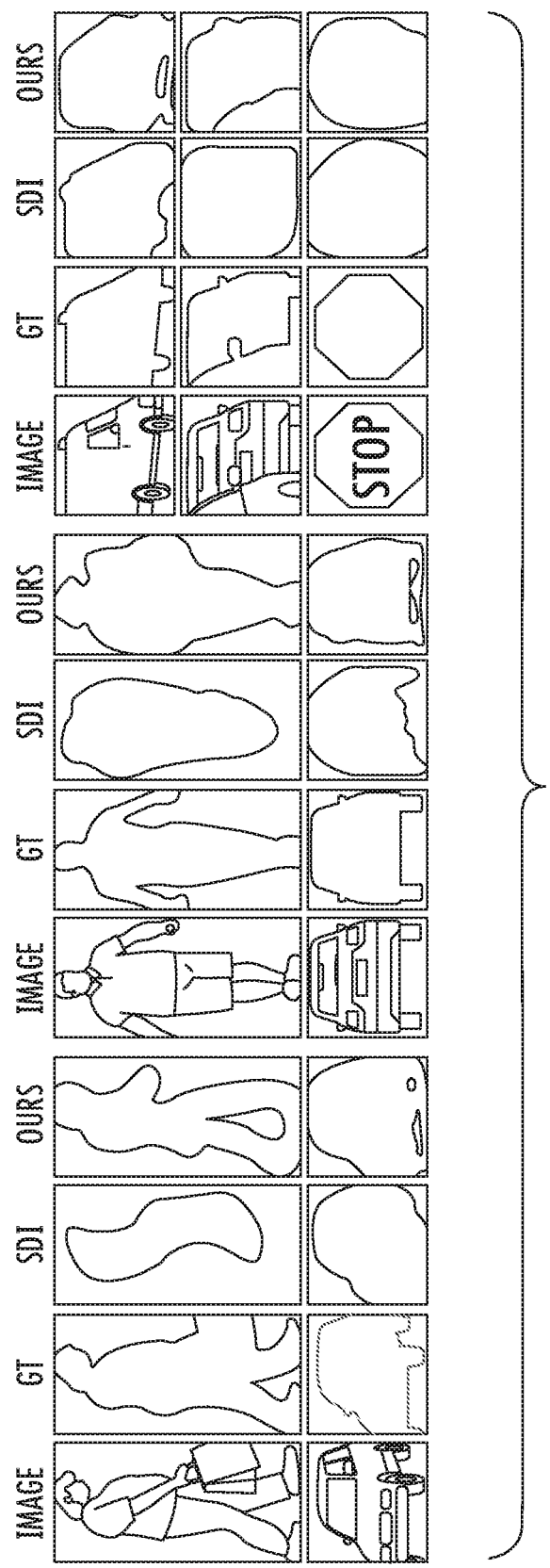
FIG. 6 depicts an example Cityscapes mask comparison according to example embodiments of the present disclosure.

FIG. 6 shows a qualitative comparison between masks generated by Cut&Paste and those by Simple Does It. In particular, from left to right: the original image, the ground truth mask (GT), the mask predicted by Simple Does It and the mask predicted by Cut&Paste. Typically the masks from both methods are comparable in quality, except in the case of people where the Cut&Paste method performs noticeably better, especially in fine details such as arms and legs.

Figure 7:
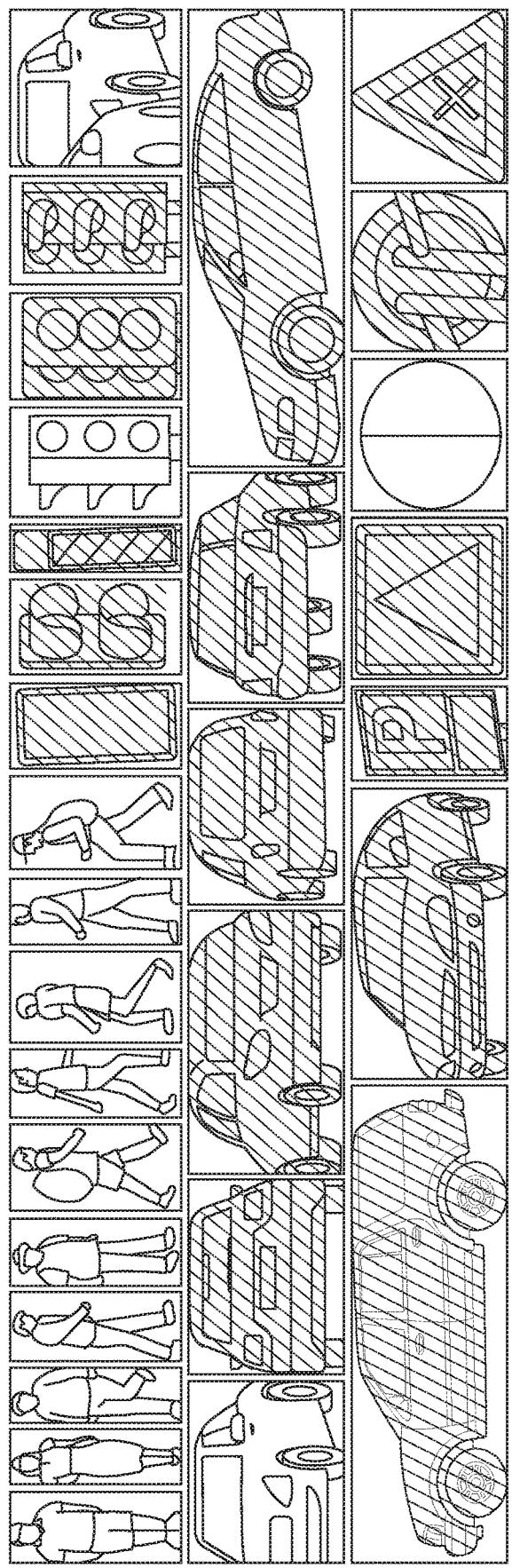
FIG. 7 depicts example Cityscapes images with masks according to example embodiments of the present disclosure.

FIG. 7 presents more examples of masks produced by Cut&Paste. These results used the $\mathcal{L}_{CPGAN}$ loss, with zero weight to cut and classification loss terms ($w_{cls}=w_{cut}=0$). See Section 4.6 for discussion and results of loss term weightings. All methods were evaluated on images at 600× 1200 resolution.

Figure 8:
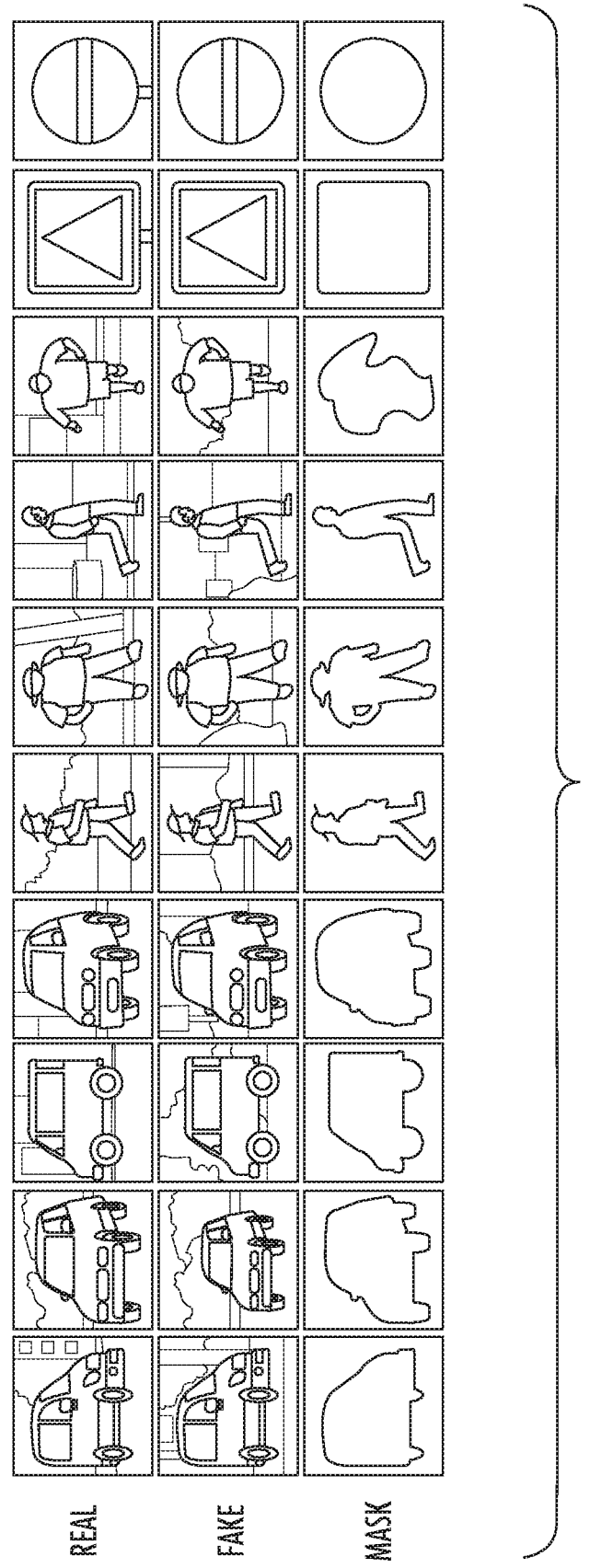
FIG. 8 depicts example Cityscapes images and masks according to example embodiments of the present disclosure.

FIG. 8 shows "fake images" created by cut-and-pasting objects using our generated masks. In particular, the top row shows the original image, and the middle row is the fake generated by compositing onto a random background with the inferred mask (bottom row). Generally, the task of generating a realistic composite is well aligned with accurate object segmentation, but there are examples where this is not the case. One such example is the shadows beneath cars, which are important to include in order to synthesize realistic images, but not actually part of the object.

4.3 Effect of Pasting Strategy

The CityScapes dataset contains object instances at a wide variety of scales corresponding to the wide range of scene depth. For realistic results, it is important to paste objects at the appropriate scale (see FIG. 4). A simple heuristic to achieve this is to paste the object along the same horizontal scanline. This approach was experimented with, shifting with a mean translation of 2×W and standard deviation W (disallowing overlaps), where W is the bounding box width. This strategy leads to a 4% absolute increase in per-pixel mask prediction accuracy (from 68% to 72%), when compared to uniformly pasting objects along both the horizontal and vertical axes. Cityscape images were also pasted into random COCO images for training. This reduced the accuracy to 60% on average and the training process was less stable.

4.4 Sampling Issues for the Discriminator Network

Convolutional networks are highly sensitive to low-level image statistics, and unintended subtle cues may allow them to "cheat", rather than solving the intended problem. This effect was observed with sampling artifacts in the proposed approach. In particular, it was found that pasting with a mask at lower resolution than the source/destination images led to a significant drop in performance. As such, some implementations of the present disclosure, compositing can be performed at the resolution of the mask. If instead it is attempted to composite at 2× this resolution, it was observed that the performance decreased from 71% to 66% in terms of per-pixel mask accuracy. The discriminator picks up on the additional blurring incurred by the lower resolution mask in real vs fake images in this case. This suggests that careful image processing is important when dealing with adversarial networks.

4.5 COCO

The COCO dataset (Lin et al.: Microsoft COCO: Common objects in context. In: European Conference on Computer Vision, Springer (2014) 740-755) contains a much wider variety of scene content and geometry than the CityScapes and aerial imagery experiments, and the objects typically occupy a much larger fraction of the image. Whilst these appear to be more difficult conditions for the cut and paste approach, we find that the cut and paste approach still works well.

Since the cut and paste approach typically pastes an object within the same image at a new position, objects were removed that were more than 30% of image width as well as very small objects (e.g., less than 14 pixels). This results in removing 36% of the total number of objects, approximately half of which are too small and half too large. For all instances, the ground truth bounding box is defined as the tightest axis-aligned box that encloses the instance mask. Fifteen percent of the official training set was set aside as a development set.

Figure 9:
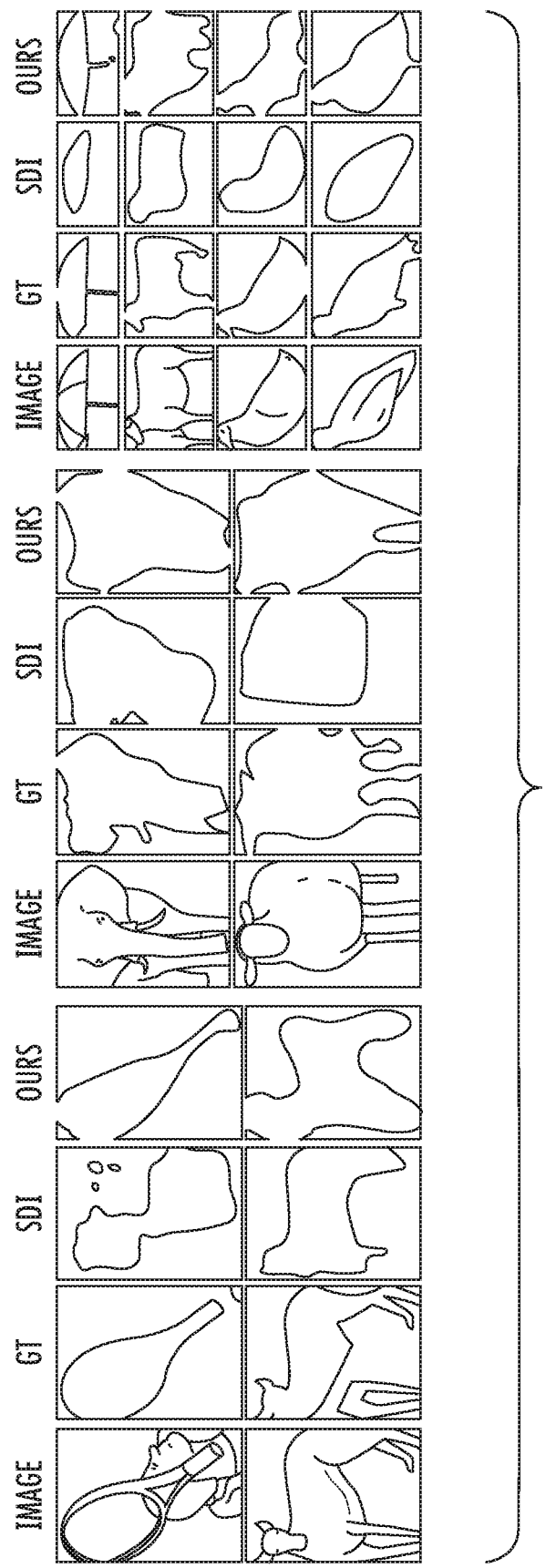
FIG. 9 depicts example COCO images and masks according to example embodiments of the present disclosure.
Figure 10:
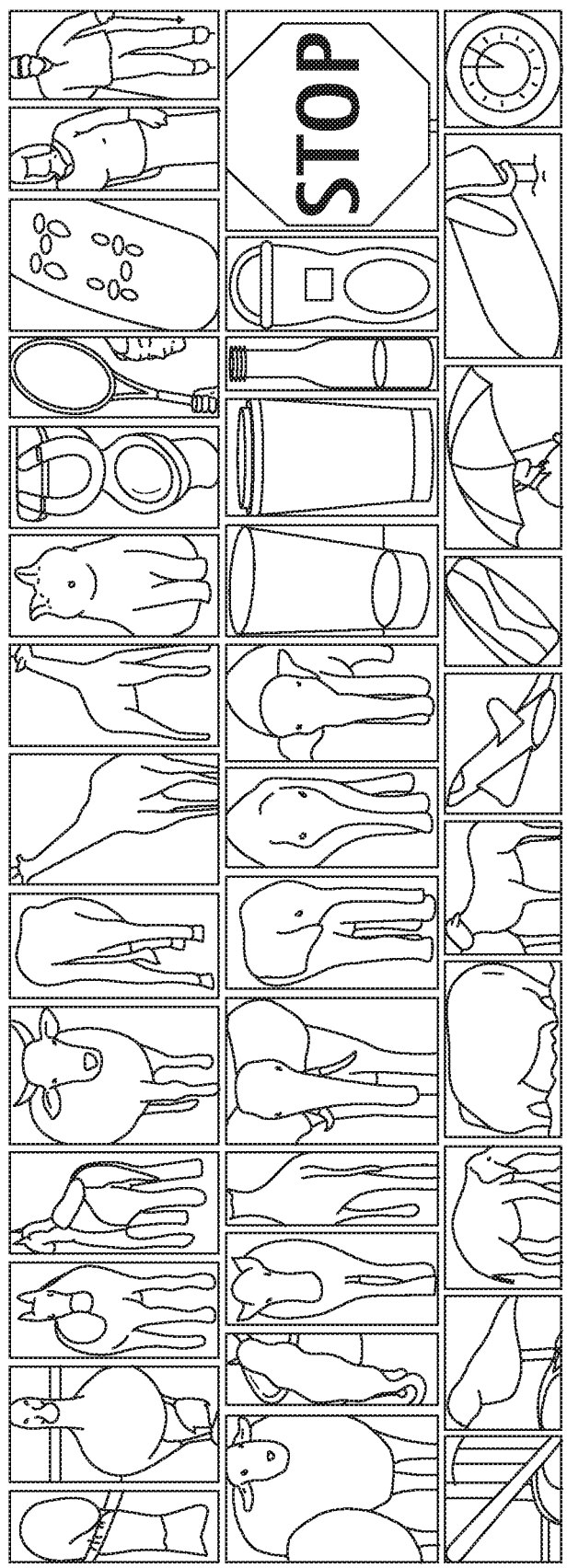
FIG. 10 depicts example COCO images with masks according to example embodiments of the present disclosure.

Table 3 presents the results for the 10 most common COCO classes, and summary results for all 80 classes. These models were trained using $w_{cls}=w_{cut}=0$. Cut&Paste exceeds the performance of GrabCut in all cases, and Simple Does It in 70% of all COCO classes. Cut&Paste performs particularly well in comparison to Simple Does It on "baseball bat" (0.43 vs 0.32 mIoU) and "skis" (0.27 vs 0.23 mIoU). These objects occupy a small fraction of the bounding box, which is problematic for Simple Does It, but fine for Cut&Paste. Cut&Paste performs less well on "kite" (0.51 vs 0.56 mIoU) and "airplane" (0.48 vs 0.55). This is perhaps due to the uniform backgrounds that are common for these classes, which will reduce the training signal seen from the cut-and-paste operation (the boundary is arbitrary when pasting with identical backgrounds). See FIGS. 9 and 10 for examples of masks produced by Cut&Paste and comparison to those produced by Simple Does It.

images consisting of 1000×1000 image tiles with annotated building masks. From this dataset, a subset of images was selected, each of which contain no more than 15 houses (in order to allow space in the same image for pasting), yielding a dataset with 1 million instances. A validation set containing 2000 instances was also similarly generated. The large size of this dataset also allows testing of performance gains as a function dataset size.

For these experiments, a Faster R-CNN Inception Resnet v2 (atrous) house detector was trained using the TensorFlow Object Detection API to be used as a backbone for feature extraction. Since the aerial images are taken at a single scale and orthorectified, objects are pasted into images at locations selected uniformly at random in both x and y directions, rejecting pasting locations that overlap with other bounding boxes in the image.

Figure 11B:
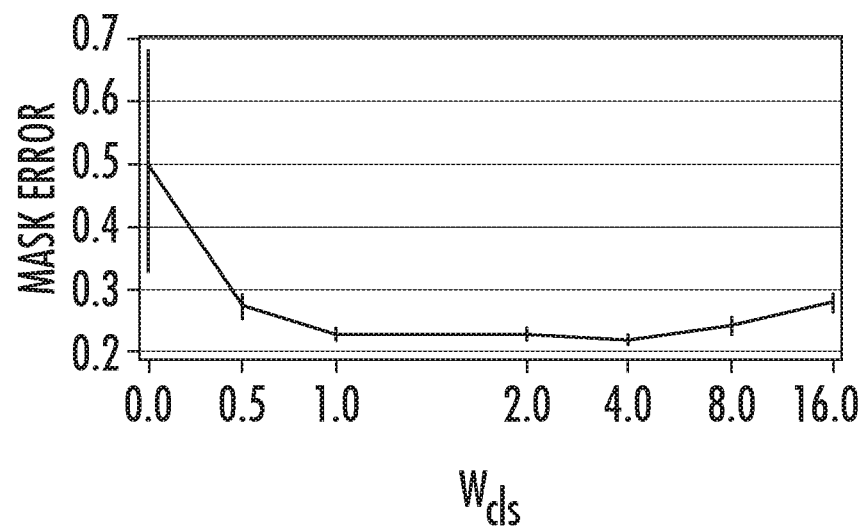
FIG. 11 depicts example plots of experimental data that demonstrate the effect of classification loss and dataset scale on mask accuracy.
Figure 11A:
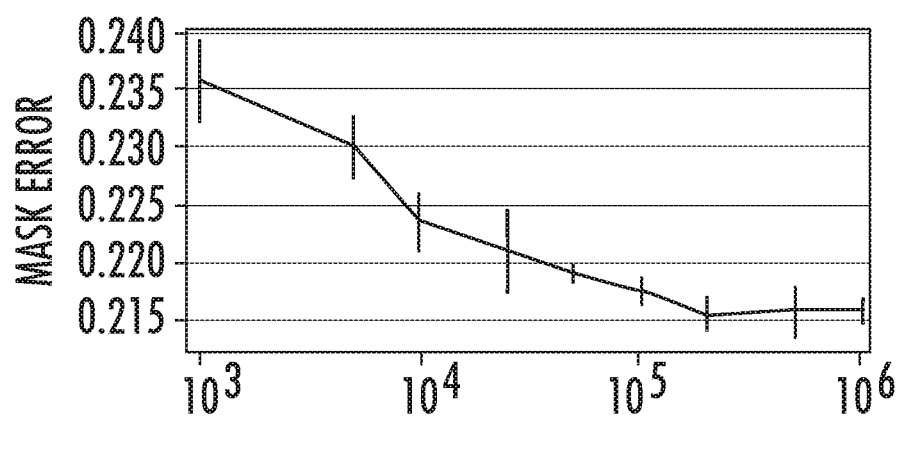

Effect of Dataset Scale: FIG. 11A shows the effect of data size on the average performance of the models. Increasing data size helps the training process, increasing the number of training instances from 5K to 1M reduces the mask prediction error by about 10%.

Figure 12:
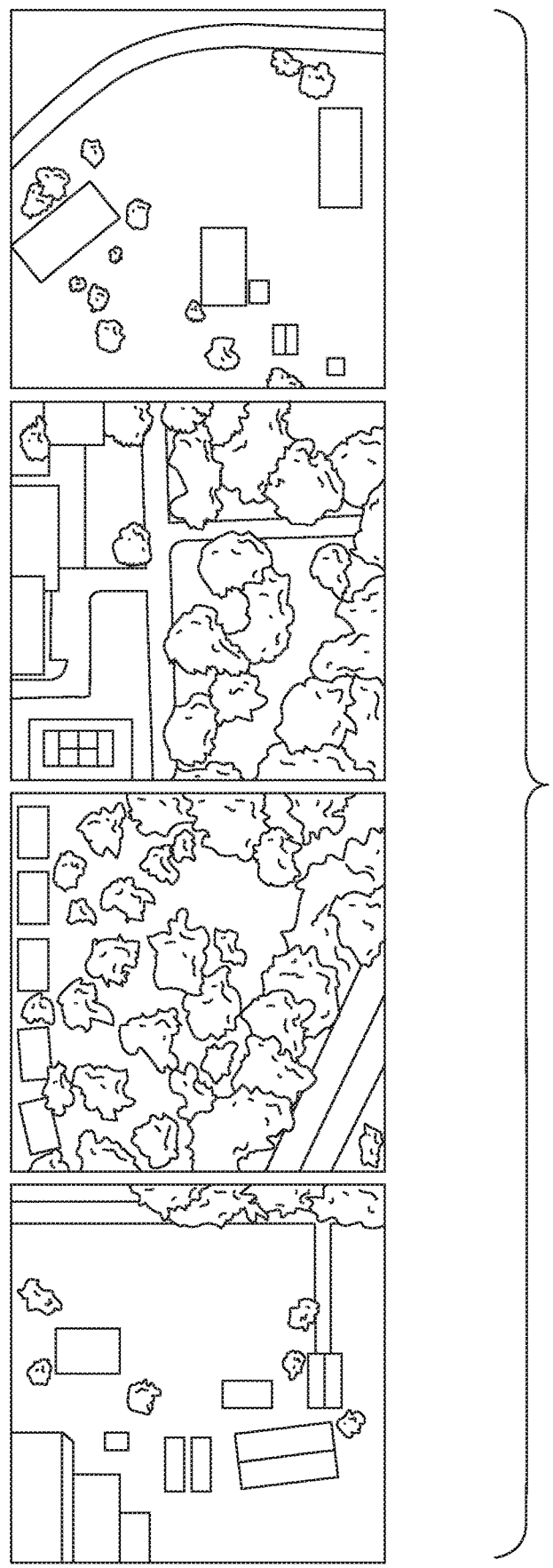
FIG. 12 depicts example aerial images with masks according to example embodiments of the present disclosure

Effect of Loss Weightings: FIG. 11B shows the effect of the classification loss weight $w_{cls}$ on the overall performance of the model. With no classification loss ($w_{cls}=0$) the performance is poor and the model is unstable, as indicated by the error bars. With increasing classification loss, performance improves and the error bars become tighter showing the training process is much more stable. The optimal weight in this case is in the range of $w_{cls} \in [1,4]$. When conducting a similar experiment for the Cityscapes dataset it was found that the classification weight increases stability but does not improve performance overall. This may be due to the high incidence of occlusion in the aerial image data, e.g., a subsection of a mask often resembles a building occluded by trees. FIG. 12 shows a few examples of typical aerial images and the segmentation masks the proposed method produces when trained using $w_{cls}=1$.

5. Example Devices and Systems

Figure 13A:
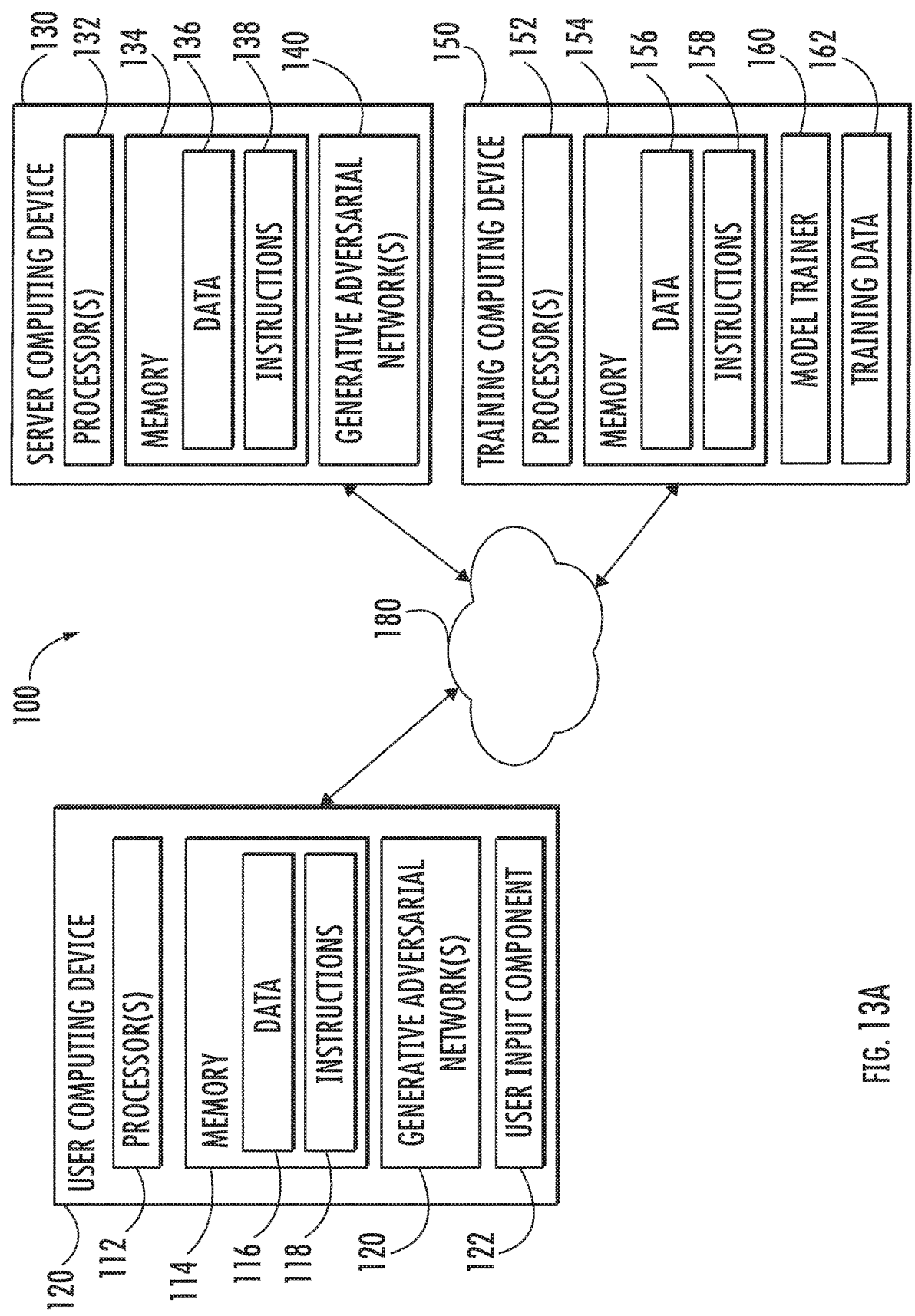
FIGS. 13A-C depict block diagrams of example computing systems according to example embodiments of the present disclosure.

FIG. 13A depicts a block diagram of an example computing system 100 that performs learning via cut and paste according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a computing device that is able to be worn, an embedded computing device, or any other type of computing device.

The user computing device 102 includes one or more processors 112 and a memory 114. The one or more processors 112 can be any suitable processing device (e.g., a

| Method | Person | Chair | Car | Cup | Bottle | Book | Bowl | Handbag | Potted plant | Umbrella | All |
|---|---|---|---|---|---|---|---|---|---|---|---|
| * Box | 0.53 | 0.54 | 0.64 | 0.75 | 0.67 | 0.58 | 0.70 | 0.52 | 0.58 | 0.51 | 0.57 |
| * GrabCut | 0.57 | 0.54 | 0.59 | 0.70 | 0.62 | 0.58 | 0.69 | 0.53 | 0.57 | 0.63 | 0.61 |
| * Simple Does It | 0.60 | 0.56 | 0.62 | 0.72 | 0.67 | 0.55 | 0.72 | 0.54 | 0.62 | 0.61 | 0.62 |
| * Cut&Paste | 0.60 | 0.56 | 0.66 | 0.78 | 0.74 | 0.61 | 0.77 | 0.58 | 0.65 | 0.61 | 0.64 |
| * Fully Supervised | 0.70 | 0.63 | 0.75 | 0.83 | 0.79 | 0.67 | 0.81 | 0.63 | 0.70 | 0.67 | 0.70 |

Table 3: mIoU performance on the 10 most common COCO categories. The final column shows average performance across all 80 categories.

4.6 Aerial Imagery

To demonstrate the effectiveness of the proposed framework in a different setting, experiments were performed with building segmentation using a proprietary dataset of aerial processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more generative adversarial networks 120. For example, the generative adversarial networks 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, or other forms of neural networks. In some implementations, the one or more generative adversarial networks 120 can be received from the server computing system 130 over network 180, stored in the user computing device memory 114, and then used or otherwise implemented by the one or more processors 112. In some implementations, the user computing device 102 can implement multiple parallel instances of a single generative adversarial network 120 (e.g., to perform parallel image segmentation across multiple images or objects within a single image).

The generative adversarial network 120 can include a generator model and one or more discriminator models. The generative adversarial network 120 can have any of the architectures or frameworks described herein. In some implementations, the user computing device 102 can include only the generator model. For example, in such implementations, the generator model can be trained in conjunction with the discriminator model but then, after training, only the generator model is supplied to and/or used by the user computing device 102. Thus, in some implementations, a generative adversarial network can be trained in the cloud or at a central system and then only the generator model portion of the network is deployed for inference at the user computing device 102. Thus, although the generative adversarial network 120 is illustrated at the user computing device 102, in some implementations, the device 102 may simply include the generator portion.

Additionally or alternatively, one or more generative adversarial networks 140 can be included in or otherwise stored and implemented by the server computing system 130 that communicates with the user computing device 102 according to a client-server relationship. For example, the generative adversarial networks 140 can be implemented by the server computing system 140 as a portion of a web service (e.g., a segmentation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, a camera, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned generative adversarial networks 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. Backwards propagation of errors can be combined with gradient descent techniques to modify the parameters of the model(s). The model trainer 160 can perform a number of generalization techniques (e.g., weight decays, dropouts, etc.) to improve the generalization capability of the models being trained.

In particular, the model trainer 160 can train the generative adversarial networks 120 and/or 140 based on a set of training data 162. The training data 162 can include, for example, images that depict one or more objects. In some implementations, the training data 162 can further include, for example, a weak supervision signal that indicates the approximate location of one or more objects, such as, for example, a bounding box.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 13A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 13B:
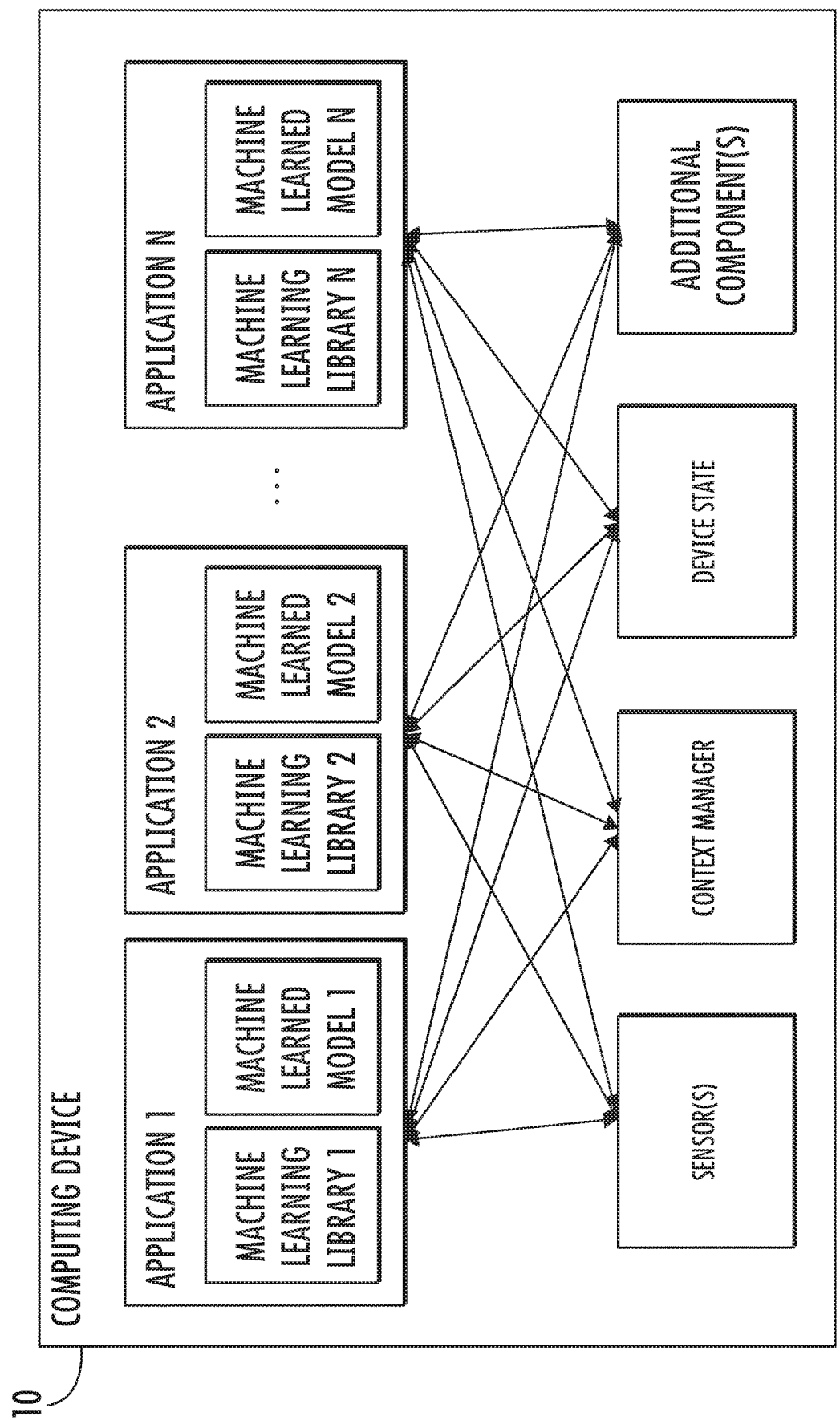

FIG. 13B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 13B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 13C:
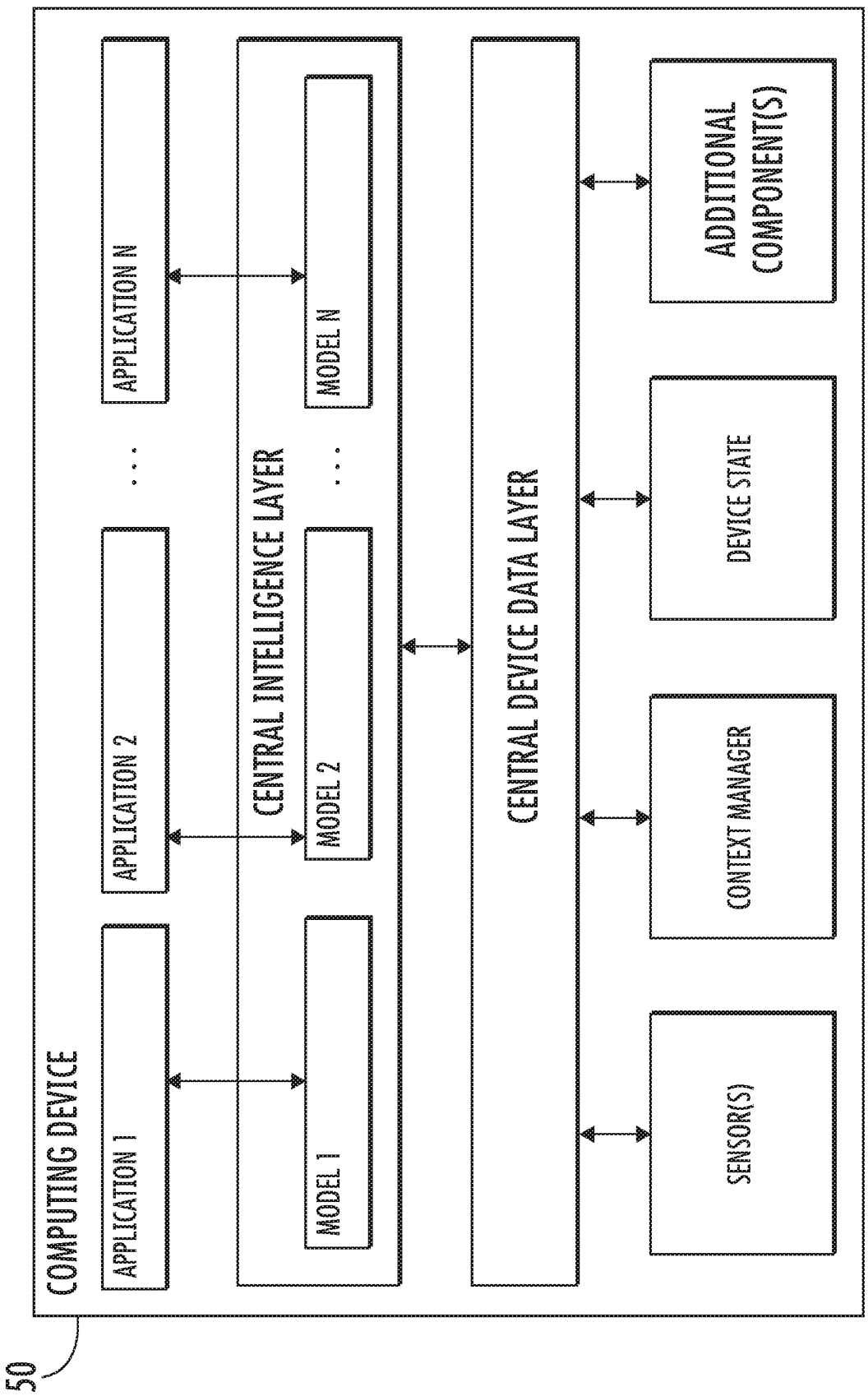

FIG. 13C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 13C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 13C, the central device data layer can communicate with a number of other components of the computing device, such as, for example, one or more sensors, a context manager, a device state component, and/or additional components. In some implementations, the central device data layer can communicate with each device component using an API (e.g., a private API).

6. Example Methods

Figure 14:
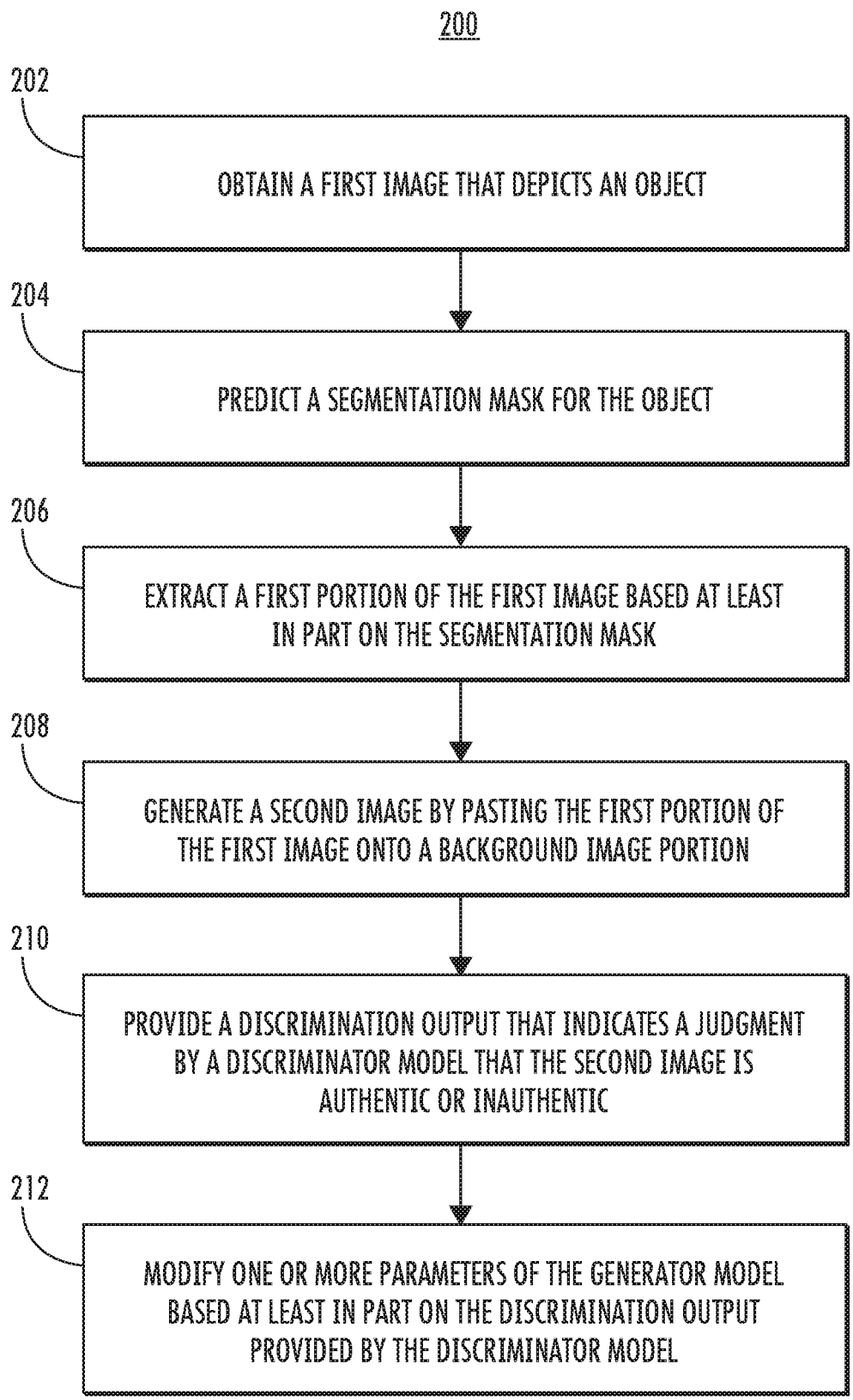
FIG. 14 depicts a flow chart diagram of an example method to train a generator model according to example embodiments of the present disclosure.

FIG. 14 depicts a flow chart diagram of an example method 200 to train a generator model to predict segmentation masks according to example embodiments of the present disclosure. Although FIG. 14 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system can obtain a first image that depicts an object. The first image can include a plurality of pixels. In some implementations, obtaining the image at 202 can further include obtaining data descriptive of an approximate location of the object within the first image. For example, the data descriptive of the approximate location of the object within the first image can include a bounding box that bounds the object within the first image or other representations of an approximate location of the object.

At 204, the computing system can predict, by a generator model, a segmentation mask for the object. The segmentation mask can identify a subset of the plurality of pixels that correspond to the object. In some implementations, predicting the segmentation mask can include extracting, by the generator model, a plurality of region of interest-aligned features associated with the object and predicting, by the generator model, the segmentation mask based at least in part on the plurality of region of interest-aligned features. Predicting, by the generator model, the segmentation mask based at least in part on the plurality of region of interest-aligned features can include applying one or more of: one or more convolutions, one or more bilinear upsampling operations, or one or more Sigmoid nonlinearity functions.

At 206, the computing system can extract a first portion of the first image based at least in part on the segmentation mask. The first portion comprises the subset of the plurality of pixels. In some implementations, the method 200 can further include (e.g., prior to said extracting) performing downsampling so that the first image matches a resolution associated with the segmentation mask.

At 208, the computing system can generate a second image by pasting the first portion of the first image onto a background image portion. In some implementations, the background image portion can be larger in size that the first portion. In some implementations, the method 200 can further include (e.g., prior to said pasting) performing downsampling so that the first portion and the background image portion match a resolution associated with the segmentation mask.

In some implementations, the background image portion can be a second portion from the first image, where the second portion is located at a different location within the first image than the first portion. In some implementations, the first portion can be pasted on the second portion at a same scanline of the first image from which the first portion was extracted.

At 210, the computing system can provide, by the discriminator model, a discrimination output that indicates a judgment by the discriminator model that the second image is authentic or inauthentic. For example, the discriminator model can compare the second image to a third portion extracted from the first image. For example, the third portion can be an original portion of the first image that depicts the object. The discriminator can provide a result indicating that one of the second image and the original portion is authentic and the other of the second image and the original portion is inauthentic.

At 212, the computing system can modify one or more parameters of the generator model based at least in part on the discrimination output provided by the discriminator model. In some implementations, modifying the parameters of the generator model at 212 can include evaluating a loss function that provides a loss value based at least in part on the discrimination output provided by the discriminator model; and modifying one or more parameters of the generator model based at least in part on the loss value.

In some implementations, the method 200 can further include inputting the second image into a classification model to obtain a classification output that classifies whether the second image depicts the object. In some of such implementations, the loss function can further include a classification loss term that provides a classification loss value based at least in part on the classification output.

In some implementations, the method 200 can further include, after the first portion has been extracted from the first image, extracting a remaining portion of the first image that is located around an original location of the first portion and includes imagery remaining after extraction of the first portion. The method 200 can further include providing the remaining portion to a second discriminator model to obtain a second discrimination output that indicates a judgment by the second discriminator model that the remaining portion is authentic or inauthentic. For example, the second discriminator can compare the remaining portion to a second remaining portion that remains after extraction of the segmentation mask from some other imagery. In some of such implementations, the loss function can further include a cut loss value based at least in part on second discrimination output.

In some implementations, the generator model and the discriminator model can be jointly trained such that the generator model learns to predict the segmentation mask that is most likely to cause the discriminator model to predict that the second image is authentic.

Method 200 can be performed any number of times to train the generator model. After training is complete, the generator model can be used to produce segmentation masks for objects in images.

7. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:
1. A computing system, comprising:
one or more processors; and
one or more non-transitory computer-readable media that collectively store:
a generative adversarial network that comprises a generator model and a discriminator model; and
instructions that, when executed by the one or more processors, cause the computing system to perform operations to train the generative adversarial network for object segmentation, the operations comprising:
obtaining a first image that depicts an object, the first image comprising a plurality of pixels;
predicting, by the generator model, a segmentation mask for the object, wherein the segmentation mask identifies a subset of the plurality of pixels that correspond to the object;
extracting a first portion of the first image based at least in part on the segmentation mask, wherein the first portion comprises the subset of the plurality of pixels;
generating a second image by pasting the first portion of the first image onto a background image portion;

providing, by the discriminator model, a discrimination output that indicates a judgment by the discriminator model that the second image is authentic or inauthentic; and modifying one or more parameters of the generator model based at least in part on the discrimination output provided by the discriminator model.

2. The computing system of claim 1, wherein:

obtaining the first image that depicts an object comprises obtaining the first image and data descriptive of an approximate location of the object within the first image; and predicting, by the generator model, the segmentation mask for the object comprises predicting, by the generator model, the segmentation mask for the object based at least in part on the data descriptive of the approximate location of the object within the first image.

3. The computing system of claim 2, wherein the data descriptive of the approximate location of the object within the first image comprises a bounding box that bounds the object within the first image.

4. The computing system of claim 1, wherein generating the second image by pasting the first portion of the first image onto the background image portion comprises:

identifying a second portion of the first image to serve as the background image portion, wherein the second portion is located at a different location within the first image than the first portion; and pasting the first portion of the first image onto the second portion of the first image.

5. The computing system of claim 4, wherein pasting the first portion of the first image onto the second portion of the first image comprises pasting the first portion onto the second portion at a same scanline of the first image from which the first portion was extracted.

6. The computing system of claim 1, wherein the background image portion is larger in size that the first portion.

7. The computing system of claim 1, wherein modifying one or more parameters of the generator model based at least in part on the discrimination output provided by the discriminator model comprises:

evaluating a loss function that provides a loss value based at least in part on the discrimination output provided by the discriminator model; and modifying one or more parameters of the generator model based at least in part on the loss value.

8. The computing system of claim 7, wherein:

the operations further comprise inputting the second image into a classification model to obtain a classification output that classifies whether the second image depicts the object; and the loss function further comprises a classification loss term that provides a classification loss value based at least in part on the classification output.

9. The computing system of claim 7, wherein:

the operations further comprise:

after the first portion has been extracted from the first image, extracting a remaining portion of the first image that is located around an original location of the first portion and includes imagery remaining after extraction of the first portion;

providing the remaining portion to a second discriminator model to obtain a second discrimination output that indicates a judgment by the second discriminator model that the remaining portion is authentic or inauthentic; and the loss function further comprises a cut loss term that provides a cut loss value based at least in part on second discrimination output.

10. The computing system of claim 1, wherein operations further comprise, after modifying the one or more parameters of the generator model:

obtaining a third image that depicts a second object; and predicting, by the generator model, a second segmentation mask for the second object.

11. The computing system of claim 1, wherein predicting, by the generator model, the segmentation mask for the object comprises:

extracting, by the generator model, a plurality of region of interest-aligned features associated with the object; and predicting, by the generator model, the segmentation mask based at least in part on the plurality of region of interest-aligned features.

12. The computing system of claim 11, wherein predicting, by the generator model, the segmentation mask based at least in part on the plurality of region of interest-aligned features comprises applying one or more of: one or more convolutions, one or more bilinear upsampling operations, or one or more Sigmoid nonlinearity functions.

13. The computing system of claim 1, wherein the operations further comprise performing downsampling so that the first portion and the background image portion match a resolution associated with the segmentation mask.

14. The computing system of claim 1, wherein providing, by the discriminator model, a discrimination output that indicates a judgment by the discriminator model that the second image is authentic or inauthentic comprises:

comparing, by the discriminator model, the second image with an original portion of the first image that depicts the object; and outputting, by the discriminator model, a result indicating that one of the second image and the original portion is authentic and the other of the second image and the original portion is inauthentic.

15. The computing system of claim 1, wherein the generator model and the discriminator model are jointly trained such that the generator model learns to predict the segmentation mask that is most likely to cause the discriminator model to predict that the second image is authentic.

16. A computer-implemented method, comprising:

obtaining, by one or more computing devices, a first image that depicts an object and data that describes an approximate location of the object within the first image;

predicting, by a generator model implemented by the one or more computing devices, a segmentation mask for the object based at least in part on the approximate location;

extracting, by the one or more computing devices, a first portion of the first image by application of the segmentation mask to the first image;

extracting, by the one or more computing devices, a second portion of the first image from a location other than the approximate location of the object;

compositing, by the one or more computing devices, the first portion of the first image with the second portion of the first image to obtain a second image; and predicting, by a discriminator model implemented by the one or more computing devices, whether the second image is authentic or inauthentic.

17. The computer-implemented method of claim 16, wherein the data descriptive of the approximate location of the object within the first image comprises a bounding box that bounds the object within the first image.

18. The computer-implemented method of claim 16, wherein compositing, by the one or more computing devices, the first portion of the first image with the second portion of the first image comprises compositing, by the one or more computing devices, the first portion onto the second portion at a same scanline of the first image from which the first portion was extracted.

19. The computer-implemented method of claim 16, wherein the second portion is larger in size that the first portion.

20. One or more non-transitory computer-readable media that collectively store:
 a machine-learned generator model configured to obtain imagery that depicts objects and to generate segmentation masks that segment the objects from backgrounds, the machine-learned generator model having been trained by a process comprising:
  obtaining a first image that depicts an object, the first image comprising a plurality of pixels;
  predicting, by the machine-learned generator model, a segmentation mask for the object, wherein the segmentation mask identifies a subset of the plurality of pixels that correspond to the object;
  extracting a first portion of the first image based at least in part on the segmentation mask, wherein the first portion comprises the subset of the plurality of pixels;
  generating a second image by pasting the first portion of the first image onto a background image portion;
  providing, by the discriminator model, a discrimination output that indicates a judgment by the discriminator model that the second image is authentic or inauthentic; and
  modifying one or more parameters of the machine-learned generator model based at least in part on the discrimination output provided by the discriminator model.

* * * * *